United States Patent
Niquille et al.

(10) Patent No.: US 10,607,181 B2
(45) Date of Patent: Mar. 31, 2020

(54) METHOD AND APPARATUS FOR STORAGE OF DATA FOR TRACKING MANUFACTURED ITEMS

(71) Applicant: INEXTO SA, Lausanne (CH)

(72) Inventors: Steve Niquille, Echichens (CH); Patrick Chanez, Cheyres (CH)

(73) Assignee: INEXTO SA, Lausanne (CH)

(*) Notice: Subject to any disclaimer, the term of this patent is extended or adjusted under 35 U.S.C. 154(b) by 342 days.

(21) Appl. No.: 14/652,217

(22) PCT Filed: Dec. 16, 2013

(86) PCT No.: PCT/EP2013/076728
§ 371 (c)(1),
(2) Date: Jun. 15, 2015

(87) PCT Pub. No.: WO2014/095740
PCT Pub. Date: Jun. 26, 2014

(65) Prior Publication Data
US 2015/0332210 A1    Nov. 19, 2015

(30) Foreign Application Priority Data
Dec. 17, 2012 (EP) .................... 12197513

(51) Int. Cl.
G06Q 10/08 (2012.01)
G06Q 30/00 (2012.01)

(52) U.S. Cl.
CPC ......... *G06Q 10/087* (2013.01); *G06Q 30/018* (2013.01)

(58) Field of Classification Search
USPC ............. 700/225; 713/179; 705/28; 235/385
See application file for complete search history.

(56) References Cited

U.S. PATENT DOCUMENTS

| 4,463,250 A | 7/1984 | McNeight |
| 5,646,389 A | 7/1997 | Bravman |

(Continued)

FOREIGN PATENT DOCUMENTS

| CN | 101551810 | 10/2009 |
| EP | 1645992 | 4/2006 |

(Continued)

OTHER PUBLICATIONS

PCT Search Report and Written Opinion for PCT/EP2013/076728 dated Feb. 20, 2014 (10 pages).

(Continued)

*Primary Examiner* — Oluseye Iwarere
*Assistant Examiner* — Reva R Danzig
(74) *Attorney, Agent, or Firm* — Mueting, Raasch & Gebhardt, P.A.

(57) ABSTRACT

The invention provides a method for the generation and storage of data for manufactured items in a batch of manufactured items that reduces data storage requirements. The method may comprise the steps of: at a production line generating a unique identifier for each item, the unique identifier comprising production details and a counter value of an incremental counter; at a production line, associating each item with the corresponding unique identifier or an encrypted version of the unique identifier; reading at least some of the unique identifiers associated with items in the batch of the items to provide a list of read identifiers, wherein at least some counter values of the incremental counter are not in the list of read identifiers; generating a plurality of ranges of read identifiers, each range comprising a number of read identifiers having common production details and sequential counter values; and storing the plurality of ranges of read identifiers having common production details as a single data record in an electronic database, the single data record comprising the production details and an indication of each of the ranges of sequential counter values.

14 Claims, 3 Drawing Sheets

(56) References Cited

U.S. PATENT DOCUMENTS

| | | |
|---|---|---|
| 5,892,900 A | 4/1999 | Ginter |
| 5,930,215 A | 7/1999 | Fite |
| 5,974,150 A | 10/1999 | Kaish |
| 6,069,955 A | 5/2000 | Coppersmith |
| 6,122,403 A | 9/2000 | Rhoads |
| 6,212,638 B1 | 4/2001 | Lee |
| 6,226,619 B1 | 5/2001 | Halperin |
| 6,260,029 B1 | 7/2001 | Critelli |
| 6,371,375 B1 | 4/2002 | Ackley |
| 6,442,276 B1 | 8/2002 | Doljack |
| 6,456,729 B1 | 9/2002 | Moore |
| 6,547,137 B1 | 4/2003 | Begelfer |
| 6,725,366 B1 | 4/2004 | Swanberg |
| 6,996,543 B1 | 2/2006 | Coppersmith |
| 7,188,258 B1 | 3/2007 | Aggarwal |
| 7,267,271 B2 | 9/2007 | Rhea |
| 7,283,630 B1 | 10/2007 | Doljack |
| 7,497,379 B2 | 3/2009 | Chen |
| 8,090,632 B1 | 1/2012 | Ortiz |
| 2001/0047340 A1 | 11/2001 | Snow |
| 2003/0074223 A1 | 4/2003 | Hickle |
| 2003/0155422 A1 | 8/2003 | Kawakami |
| 2004/0140362 A1 | 7/2004 | Allen |
| 2004/0212480 A1 | 10/2004 | Carrender |
| 2005/0006469 A1 | 1/2005 | Nonneman |
| 2005/0127176 A1 | 6/2005 | Dickinson |
| 2005/0234823 A1 | 10/2005 | Schimpf |
| 2005/0273369 A1 | 12/2005 | Ota |
| 2006/0080190 A1 | 4/2006 | Furukawa |
| 2006/0144940 A1 | 7/2006 | Shannon |
| 2007/0001006 A1 | 1/2007 | Schuessler |
| 2007/0024449 A1 | 2/2007 | Bilyeu |
| 2007/0203808 A1 | 8/2007 | Sekimoto |
| 2008/0046263 A1 | 2/2008 | Sager |
| 2009/0014537 A1 | 1/2009 | Gelbman |
| 2009/0159666 A1 | 6/2009 | O'Brien |
| 2009/0230190 A1* | 9/2009 | Chanez ............... G06Q 10/08 235/385 |
| 2011/0154046 A1* | 6/2011 | Fradet ............... G06Q 10/087 713/179 |
| 2011/0265428 A1* | 11/2011 | Schmitz ............... G06Q 10/08 53/444 |
| 2012/0102334 A1 | 4/2012 | O'Loughlin |
| 2014/0046852 A1 | 2/2014 | Chatelain |
| 2014/0343719 A1* | 11/2014 | Collombet ............. G06K 19/00 700/225 |
| 2015/0310386 A1 | 10/2015 | Fradet |
| 2015/0317644 A1 | 11/2015 | Chanez |

FOREIGN PATENT DOCUMENTS

| | | |
|---|---|---|
| EP | 2104067 | 9/2009 |
| FR | 2900486 | 11/2007 |
| JP | H05151381 | 6/1993 |
| JP | H07-156459 | 6/1995 |
| JP | H08-69247 A | 3/1996 |
| JP | 2001-328711 | 11/2001 |
| JP | 2003-104562 | 4/2003 |
| JP | 2003/208234 | 7/2003 |
| JP | 2005-060080 | 3/2005 |
| JP | 2005-115890 | 4/2005 |
| JP | 2005-200187 | 7/2005 |
| JP | 2005-263472 | 9/2005 |
| JP | 2005-316940 | 11/2005 |
| JP | 2007-018355 | 1/2007 |
| JP | 2007-528830 | 10/2007 |
| JP | 2008-515741 | 5/2008 |
| JP | 2009-151668 | 7/2009 |
| KR | 100911762 | 8/2009 |
| RU | 2216776 | 11/2003 |
| WO | WO 02/073551 | 9/2002 |
| WO | WO 2005/008554 | 1/2005 |
| WO | WO 2005/083644 | 9/2005 |
| WO | WO 2006/038114 | 4/2006 |
| WO | WO 2014/122479 | 8/2014 |

OTHER PUBLICATIONS

"Best Compression Algorithm for a Sequence of Integers", Stack Overflow, Nov. 8, 2008, XP002697996, retrieved from the Internet: http://stackoverflow.com/questions/283299/best-compression-alorithm-for-a-sequence-of-integers [retrieved on May 31, 2013).

European Extended Search Report for Application No. 12197513.0-1958 dated Jul. 4, 2013 (6 pages).

Databases—No Longer Fit for Purpose for Serialisation and Track & Trace, Zeller SSP, XP055065846, 2001-2012 (6 pages).

Moroccan Search Report for Application No. 38281 dated Mar. 28, 2015 (3 pages).

* cited by examiner

METHOD AND APPARATUS FOR STORAGE OF DATA FOR TRACKING MANUFACTURED ITEMS

This application is a U.S. National Stage Application of International Application No. PCT/EP2013/076728, filed Dec. 16, 2013, which was published in English on Jun. 26, 2014 as International Patent Publication WO 2014/095740 A1. International Application No. PCT/EP2013/076728 claims priority to European Application No. 12197513.0 filed Dec. 17, 2012.

The present invention relates to methods and apparatus for tracking and tracing manufactured items. In particular, the present invention relates to tracking packaged goods produced in very large volumes.

In the context of data storage and transmission, "serialization" is the process of converting an item, such as a unique serial number, into a sequence of bits. This sequence of bits can be collected, stored on a storage medium, or transmitted across a communications link. The serialization process may be secure or non-secure, or may or may not be protected with cryptography or a cryptographic mechanism, such as, but not limited to, encryption or a digital signature. The sequence of bits may be used for identifying individual manufactured items during a manufacturing or distribution process.

The data created by serialization and the serialized products may be used for identification by manufacturers, distributors, retailers and end users. It may also be used for other parties outside the manufacturing, distribution and retail process, such as national authorities and regulators. Authorized parties may also be required to determine the actual number of items manufactured, for example, for tax reasons. This is known as volume verification.

Regulations are increasingly being introduced to require manufacturers to be able to securely identify, authenticate and trace items during the manufacturing process. This is particularly important for goods where quality is critical and inferior quality is detrimental to the customer and the manufacturer. In addition, for goods where quality or brand value is critical, counterfeiting may cause significant loss of revenue and reputation, and should be fought as much as possible.

The term "manufactured items" as used herein means items produced by a manufacturing process and intended for distribution or sale to customers or end users. Typically, manufactured items are produced in batches. Once a batch run has been initiated, the individual manufactured items which are produced can be marked with a unique serial number or identifier. Identifiers for all the items in a particular manufacturing batch may be derived from a single set of data points. For example, the identifiers may all include a batch identifier. The batch identifier is an identifier for a particular manufacturing batch which explicitly identifies the batch when a unit was produced. Alternatively, an identifier may be used to implicitly identify the batch when a unit was produced. For example, the implicit identifier may define the production details (place, date, time, etc.) which could point to a particular batch. This implicit identifier may provide information regarding production and can be used to trace the item through the manufacturing and distribution processes.

In addition, it is often the case that a batch of identifiers is produced for a batch of items, but not all the identifiers are used for the items that are manufactured. This may be for various reasons. For example, there may be production gaps, and reordering of items in the manufacturing process, which makes it convenient to have gaps and reordering in the identifiers actually used. There may also be products identified later in the manufacturing process which are rejected for quality reasons.

There are clearly advantages in using serialization for manufactured items during a manufacturing process. However, when the manufacturing process is a high-speed manufacturing process in which a large number of items are being produced at a high production rate, the amount of storage space required for the serialization and the serialized data will be significant. Cigarette manufacturing is an example of such a high speed process. The result is that data storage requirements become potentially prohibitive. In addition, if the data needs to be transmitted across a communications link, the large bandwidth required will be potentially prohibitive.

Therefore, there exists a need for an improved method and apparatus for storage of data for a batch of manufactured items, particularly for serialization of a batch of manufactured items.

In one aspect of the disclosure, there is provided a method for the generation and storage of data for manufactured items in a batch of manufactured items, the method comprising the steps of:

at a production line generating a unique identifier for each item, the unique identifier comprising production details and a counter value of an incremental counter;

at a production line, associating each item with the corresponding unique identifier;

reading at least some of the unique identifiers associated with items in the batch of the items to provide a list of read identifiers, wherein at least some counter values of the incremental counter are not in the list of read identifiers;

generating a plurality of ranges of read identifiers, each range comprising a number of read identifiers having common production details and sequential counter values; and storing the plurality of ranges of read identifiers having common production details as a single data record in an electronic database, the single data record comprising the production details and an indication of each of the ranges of sequential counter values.

The method of the present invention minimises system data storage and data bandwidth requirements for tracking very large numbers of items marked with unique identifiers. This is particularly relevant where each of the unique identifiers share a common portion which is, or encodes, common production details. The term "production details" as used herein includes any information related to the production of a manufactured item, such as production line, production place, and production time. For items that are produced in high speed manufacturing processes, many of the produced items will inevitably share production details. For example, many individual items may be produced by a single production line in a single minute. So, each of those items will share some production details, such as production line, production place, and production time and date down to the level of a minute.

The items are distinguished by a counter value generated by an incremental counter. Inevitably some items produced at the production line will not be shipped because they fail to meet quality standards or are lost or removed for some other reason. Furthermore, some items that are included in a shipment may not have their unique identifier successfully read by the reading system that is used. Accordingly, not all of the sequential counter values that are generated will be in a read identifier. For that reason, a plurality of ranges of sequential counter values is stored.

Counter values of the incremental counter that are not associated with items in the batch or not successfully read in the step of reading, but which are between the counter values contained in the ranges of the single data record, may be included in the single data record. Alternatively, or in addition, an indication of a number of unread identifiers may be included in the single data record.

Reading an identifier in this context means determining the form or content of an identifier by any suitable means, such as optical scanning, digital photography and image processing, or magnetic scanning. Associating in this context includes both directly marking an item, such as by printing or embossing, and adhering a label to an item.

The production details may comprise a production location. The production details may comprise a production time. The production location may comprise one or both of the production centre and the specific production line, or the Code Generator Identification. The Code Generator Identification is an identifier uniquely identifying the point where the unit identifier is generated—see, for example, WO 2006/038114A1. The production time may be specified as accurately as desired and this will probably depend on the speed of production of the units. For example, the production time may be specified in terms of hours only. Alternatively, the production time may be specified in terms of hours and minutes. Alternatively, the production time may be specified in terms of hours, minutes and seconds.

Each item may be an individual product or may be a package containing a plurality of products. Unique identifiers may be provided for packages of products as well as larger containers containing a plurality of packages. The identifiers for the packages and the containers may be linked to one another or stored together in the electronic database.

A count of the unread identifiers within the batch may be included in the single data record. The count of unread identifiers may be included as a single range in the single data record.

The step of associating each item with the corresponding unique identifier may comprise associating each item with an unencrypted version of the unique identifier or with an encrypted version of the unique identifier.

In another aspect of the disclosure there is provided a method for tracking an item having a unique identifier generated and stored in accordance with the one aspect, comprising the steps of:

reading the unique identifier associated with the item;

extracting the production details from the unique identifier; and extracting data records having matching production details from the electronic database.

The method for tracking may further comprise identifying the unique identifier from the data records having matching production details. The method may further comprise the steps of recording the location of the item where the step of reading is performed and storing the location in the electronic database.

The term "tracking" is used to mean the monitoring of movement, location and time of the units and containers as they are transported and stored in the supply chain. This is particularly useful during the delivery process when units and containers may be passing through various shippers, delivery companies, importers and distributors on their way to customers. Tracing is the ability to re-create that movement up to a certain point in the supply chain, to help determine where the product was diverted into illegal channels.

In another aspect of the disclosure there is provided an apparatus for generating and storage of data for manufactured items in a batch of manufactured items comprising:

at a production line, means for generating an unique identifier for each item, the unique identifier comprising production details and a counter value of an incremental counter;

at a production line, means for associating each item with the corresponding unique identifier;

reading means for reading the unique identifiers associated with items in the batch of the items to provide a list of read identifiers;

processing means for generating a plurality of ranges of read identifiers, each range comprising a number of read identifiers having common production details and sequential counter values; and memory means hosting an electronic database storing the plurality of ranges of read identifiers having common production details as a single data record, the single data record comprising the production details and an indication of each of the ranges of sequential counter values.

Typically at least some counter values of the incremental counter are not in the list of read identifiers. This is due to unreadable identifiers, reordering of items or removal of items before shipping for quality control reasons. For this reason a plurality of ranges of read identifiers is generated. Counter values of the incremental counter that are not associated with items in the batch or which were not successfully read by the reading means, but which are between the counter values contained in the ranges of the single data record, may be included in the single data record.

The means for associating may be configured to associate each item with an unencrypted version of the unique identifier or with an encrypted version of the unique identifier.

The means for associating may be a printer or a label applicator. The means for reading may be an optical scanner. The processing means may be one or more computer processors. The memory means may be one or more non-volatile data storage media.

Embodiments of the invention will now be described in detail, by way of example only, with reference to the accompanying drawings, in which.

Small products, and in particular consumable products such as cigarettes, are typically distributed and sold in containers holding a plurality of individual products or packs of products.

Figure 1:
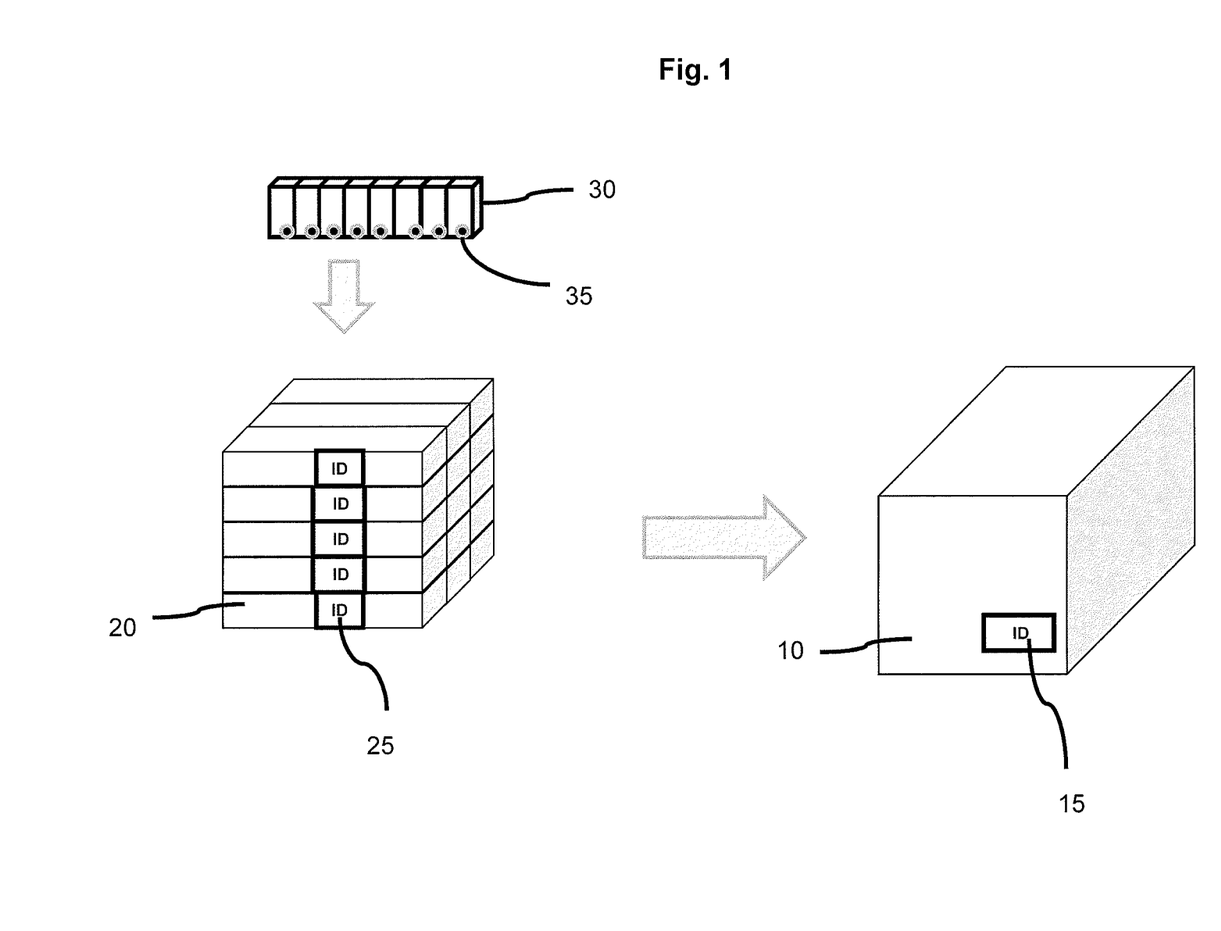
FIG. 1 is a schematic illustration of the relationship between, packs, cartons and cases of cigarettes.

FIG. 1 illustrates how a shipping case 10 of cigarettes may contain a plurality of cartons 20, typically 50 cartons per shipping case. Each carton 20 contains a plurality of packs of cigarettes, typically 10 packs of cigarettes 30 per carton. Each pack 30 typically contains 20 cigarettes. In order to allow each pack of cigarettes to be tracked through the distribution chain and authenticated as a genuine product each pack 30 is marked with an identifier 35, such as a barcode or alphanumeric code. Each carton 20 is also marked with an identifier 25 and each shipping case 10 is marked with an identifier 15.

Figure 2:
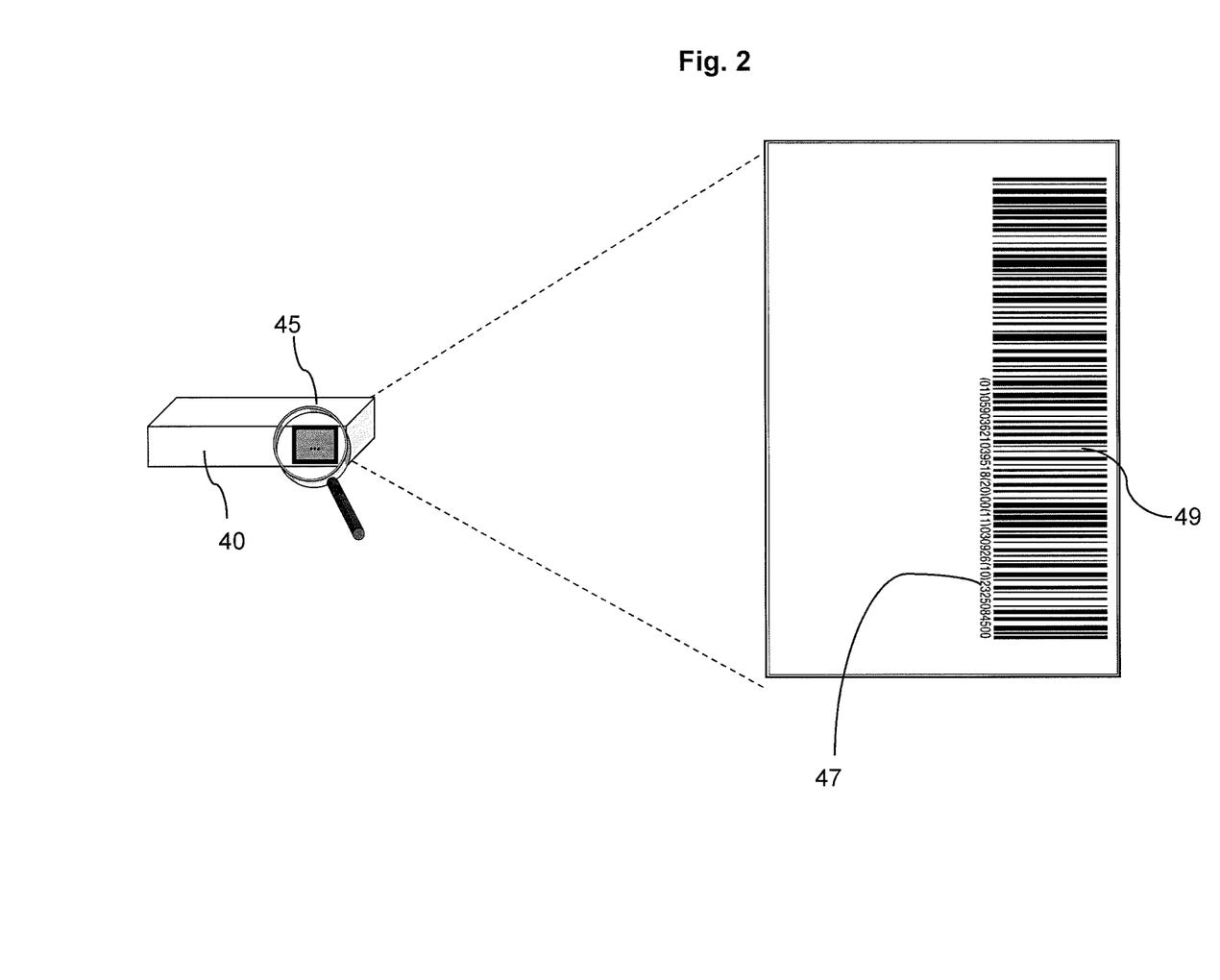
FIG. 2 illustrates an example of a manufactured item having an identifying label including the manufacturer's unique identifier.

FIG. 2 shows a manufactured item 40 having an identifier 45. In the embodiment of FIG. 2, the manufactured item identifier 45 comprises two portions: a machine-readable identifier 47 and a human-readable identifier 49. In the embodiment of FIG. 2, the human-readable identifier 49 is a 40 digit number. The 40 digit number is encoded into an EAN-128 (also known as GS1-128) barcode which forms the machine-readable identifier 47. The identifier 49, and hence the identifier 47, is unique for each particular manufactured item. In this embodiment, the identifiers 47 and 49 typically identify information including, but not limited to, the production date (YYMMDD), the production time (HHMMSS), the production centre, and the case packer number. The customer recipient of the shipping case may also be identified if already known.

Any suitable identifier may be used. For example a two-dimensional ("2D") barcode in the form of a data matrix may be used. WO2006/038114A1 describes an example of a suitable method for generating a unique identifier.

The item identifier can be used for tracking the item. For example, a customer order may be linked to the identifying label or labels of the particular shipping case or cases containing the ordered goods. This allows the customer, the manufacturer and any intermediaries to constantly track the location of the required goods. This may be achieved using scanners for scanning the identifiers and communicating with a central database. Alternatively, the identifiers can be read by a human, who can then manually communicate with a central database.

The identifiers may also be used by customers, national authorities and other parties, to verify that a particular item contains genuine products. For example, a party may use a scanner to read the identifier on a shipping case (or the identifier can be read by a human, as discussed above). The identifier details may be sent to the central database. The central database can then look up the identifier details, determine the shipping case production details and send those details to the scanner, thereby allowing the party to verify the shipping case, and the products contained therein, as genuine. In the event that the central database does not recognise the identifier, the party may suppose that the articles in question are counterfeit.

The identifiers may also be used for tracing items. For example, if the manufacturer needs to recall the products from a selected number of shipping cases, those shipping cases can be traced using their identifiers.

Figure 3:
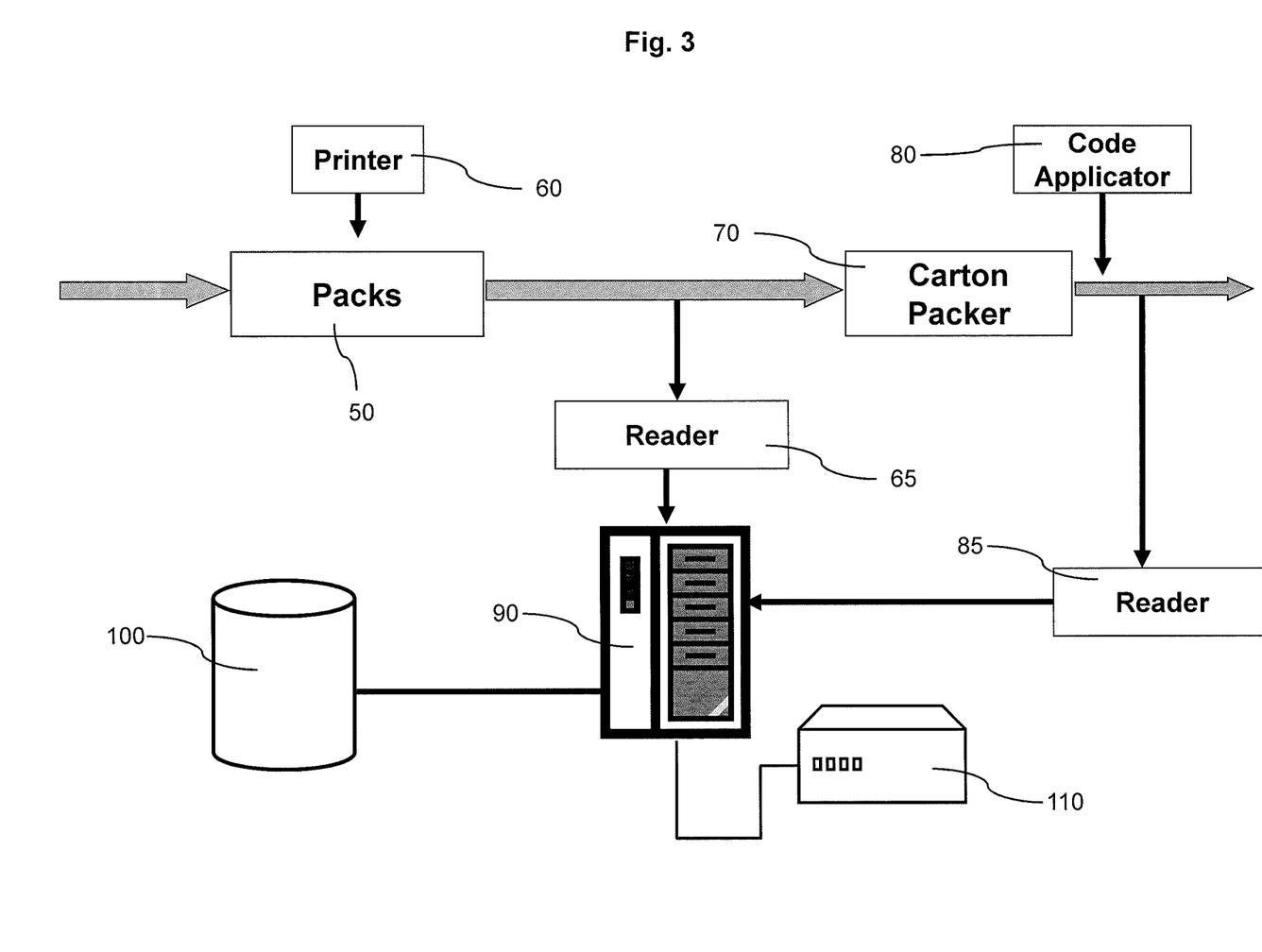
FIG. 3 illustrates the application of identifiers to items in a production line and the subsequent reading and storage of the identifiers.

FIG. 3 shows an exemplary method for implementing an embodiment of the invention at a cigarette production line. Each pack of cigarettes 50 is applied with an identifier of the type shown in FIG. 2 by a printer 60. As each pack 50 proceeds to a case packer 70, the identifiers are read by a first optical scanner 65. Each read identifier is sent to a server 90 and a corresponding record is stored in an electronic database 100.

A plurality of packs 50 are packed into a carton and a plurality of cartons are packed into a shipping case. For simplicity, FIG. 3 only illustrates the carton packer 70, although the same basic arrangement is also used for the shipping cases. Each carton is applied with an identifier by a code applicator 80, which in this example is a label applicator. As each carton leaves the carton packer to proceed to the shipping case packer, the carton identifier is read by a second optical scanner 85 and sent to the server 90. The production line monitors which packs and cartons are allocated to which shipping case. Once the packs and cartons associated with a shipping case have been established, one or more ranges of production details can be stored for that shipping case. That is for each shipping case identifier, ranges are identified and stored. Thus, in the database 100, a shipping case identifier is linked to the appropriate range or ranges of the production details of the cartons and packs packed in the shipping case. The number of ranges required in certain circumstances will be discussed further below.

Once the shipping cases, cartons and packs have been identified as described with reference to FIG. 3, individual cartons can be authenticated, tracked and traced as will now be described.

A customer, distributor, national authority or other authorised party can read the identifier on a pack or carton. This pack or carton identifier can then be sent to the central database 100. From the database, the associated shipping case can be identified. This can be used to authenticate that the pack or carton is genuine and has indeed originated from a genuine source and was originally packed into a genuine shipping case. Of course, if the pack or carton identifier is not recognisable, or if it cannot be linked to a shipping case, the supposition may be that the pack or carton is counterfeit. In addition, for tracking purposes, the location of the pack or carton can be stored when the identifier is sent to the database 100 and this data can be used to track the movement of the pack or carton, for example, the route taken by the pack or carton. That information can also be used for tracing individual packs or cartons, for example for product recall.

The present applicant has already proposed a method of linking a shipping case identifier to the cartons contained within the shipping case. In that method, each carton identifier is a 12-digit alphanumeric code. On the carton itself, the 12-digit alphanumeric code may be coded into a 2D barcode in the form of a datamatrix. The 12-digit code may also be printed onto the carton. As already mentioned, each shipping case identifier may a 40-digit number.

Thus, for that system, data storage in the database might be as shown in Table 1.

TABLE 1

| CARTON IDENTIFIER 101a | SHIPPING CASE IDENTIFIER 103a |
|---|---|
| L73Q2M5JQC47 | 0107623900507450200411071123100215222123 |
| 7S6UAJBL3U62 | 0107623900507450200411071123100215222123 |
| 4XJLKTND82CH | 0107623900507450200411071123100215222123 |
| CSY6KVHK4MTC | 0107623900507450200411071123100215222123 |
| C6SY9V53CXB6 | 0107623900507450200411071123100215222123 |
| HVD31USQ0U0V | 0107623900507450200411071123100215222123 |
| DBJ2UBX5RWCC | 0107623900507450200411071123100215222123 |
| ELQU4CJNAL57 | 0107623900507450200411071123100215222123 |
| PWA2E2TZYCWK | 0107623900507450200411071123100215222123 |
| 9UB9ASGG20F6 | 0107623900507450200411071123100215222123 |
| U26V5VKG8WCH | 0107623900507450200411071123100215222123 |
| . . . | . . . |

Thus, each carton identifier (in this case a 12-digit alphanumeric code) is linked to the identifier of the shipping case (in this case a 40-digit number) to which it is allocated. Each shipping case identifier is, in turn, linked to the carton identifiers of all the cartons contained in the shipping case.

Consider the above described example used for tobacco products. In this case, each shipping case contains 50 cartons. Each shipping case has an identifier which comprises a 40 digit code. In one example, because of repetition of certain digits and redundancy of certain digits (at least for this purpose), this can be compacted into 8 Bytes of storage. Each carton has an identifier which comprises a 12-digit alphanumeric code. Each alphanumeric digit requires 1 Byte of storage. So each, carton identifier requires 12 Bytes of storage. Thus, each shipping case requires 50×(12+8)=1000 Bytes≈1 kByte of storage (since the 40 digit code is stored for every alphanumeric code). Given the huge numbers of smoking articles produced worldwide, the database size required will be enormous. If individual packs within cartons are also to be tracked, the database size will be unfeasibly large and the system could not be practically implemented for individual packs.

In a method already proposed by the applicant, data storage requirements can be reduced by storing ranges of identifiers. In this method, each identifier is an encrypted version of the following information: the code generator ID that generates the unique identifier, the production date and time, and an incremental counter reset at the start of each minute (see, for example, WO-A-2006/038114, already mentioned). That is, in this embodiment, each identifier is an encrypted version of production details of the respective carton. Thus, the identifier information for cartons might be as shown in Table 2.

TABLE 2

| CARTON IDENTIFIER | CODE GENERATOR ID | PRODUCTION DATE & TIME | COUNTER |
|---|---|---|---|
| ... | ... | ... | ... |
| L73Q2M5JQC47 | 116 | 23 Nov. 2007 10:11 | 86 |
| 7S6UAJBL3U62 | 116 | 23 Nov. 2007 10:11 | 87 |
| 4XJLKTND82CH | 116 | 23 Nov. 2007 10:11 | 88 |
| CSY6KVHK4MTC | 116 | 23 Nov. 2007 10:11 | 89 |
| C6SY9V53CXB6 | 116 | 23 Nov. 2007 10:11 | 90 |
| HVD31USQ0U0V | 116 | 23 Nov. 2007 10:12 | 1 |
| DBJ2UBX5RWCC | 116 | 23 Nov. 2007 10:12 | 2 |
| ELQU4CJNAL57 | 116 | 23 Nov. 2007 10:12 | 3 |
| PWA2E2TZYCWK | 116 | 23 Nov. 2007 10:12 | 4 |
| 9UB9ASGG20F6 | 116 | 23 Nov. 2007 10:12 | 5 |
| U26V5VKG8WCH | 116 | 23 Nov. 2007 10:12 | 6 |
| ... | ... | ... | ... |

Note that Table 2 shows the connection between the encrypted carton identifier and the production details. Since, in this embodiment, the carton identifier is the production details, in encrypted form, there is no need to store both the carton identifier and the production details, as long as the key used for encryption is known (see, for example, WO-A-2006/038114, already mentioned). Thus, Table 2 does not represent what is actually stored in the database.

Because of the counter, the production details for each carton are unique, even if several cartons are produced each minute.

Each carton is then allocated to a shipping case. Depending on which cartons are allocated to a shipping case, ranges of the production details of the cartons allocated are defined. For example, if the 11 cartons identified in Table 2 are all allocated to a single shipping case, two ranges are defined. The first range will be cartons produced on date 23 Nov. 2007, at time 10:11 on the Code Generator 116, having Counters 86 to 90. This will cover the first five cartons. The second range will be cartons produced on date 23 Nov. 2007, at time 10:12 on the Code Generator 116, having Counters 1 to 6. This will cover the final six cartons. Thus, for a shipping case containing these eleven cartons, only two ranges would need to be stored, as shown in Table 3.

TABLE 3

| SHIPPING CASE IDENTIFIER | CODE GENERATOR ID | PRODUCTION DATE & TIME | FROM COUNTER | TO COUNTER |
|---|---|---|---|---|
| 010 ... 123 | 116 | 23 Nov. 2007 10:11 | 86 | 90 |
| 010 ... 123 | 116 | 23 Nov. 2007 10:12 | 1 | 6 |

Because the production details for each carton are unique, each range defines a precise range of cartons. In this case, the production details are unique because, for cartons produced within the same minute, the incremental counter is different, and the incremental counter is reset each minute.

While this method of storing ranges of identifiers reduces the amount of data storage and transmission required and is adequate for tracking cartons and shipping cases, there is benefit in reducing the data storage further, particularly in order to track individual packs of cigarettes. The number of packs of cigarettes in the distribution chain is ten times the number of cartons as each carton contains ten packs.

Furthermore, with the method described, a large number of ranges may need to be stored if some counter values are not allocated to an item to be shipped or if some identifiers are not read successfully. The problem of unsuccessful reading of identifiers is more significant when reading identifiers on individual packs as it needs to be done a high speed if the reading process is to take place without significantly slowing down production.

Consider a shipping case containing five cartons, each carton containing 10 packets of cigarettes. All of the packs in the case were produced on Oct. 10, 2010 at 8:30 and the identifiers generated by the same code generator. However, some of the carton and pack identifiers were not successfully read at the production line, indicated by the counter numbers in bold in Table 4 below, which shows the cartons and associated pack counter values.

TABLE 4

| CARTON COUNTER | PACK COUNTER |
|---|---|
| 1 | 1, 2, 3, 4, 5, 6, 7, 8, 9, 10 |
| 2 | 11, 12, 13, 14, 15, 16, 17, 18, 19, 20 |
| 3 | 21, 22, 23, 24, 25, 26, 27, 28, 29, 30 |
| 4 | 31, 32, 33, 34, 35, 36, 37, 38, 39, 40 |
| 5 | 41, 42, 43, 44, 45, 46, 47, 48, 49, 50 |

To reduce data storage the unread or unallocated counters can be stored in a single "range". To do this the data is reordered to put the unread counter values together, as shown in Table 5 below:

TABLE 5

| Carton Counter | Pack Counter |
|---|---|
| 1 | 1, 2, 4, 5, 6, 9, 10, unread, unread, unread |
| 3 | 21, 22, 23, 24, 26, 27, 29, 30, unread, unread |
| 4 | 31, 32, 33, 34, 35, 36, 39, 40, unread, unread |
| 5 | 47, 48, 49, 50, unread, unread, unread, unread, unread, unread |
| unread | 12, 13, 19, 20, unread, unread, unread, unread, unread, unread |

Based on this reorganisation the identifiers can be compressed into ranges in the manner shown in Table 3. Table 6 shows the ranges for the cartons and Table 7 shows the ranges for the packs.

TABLE 6

| RANGE ID | CODE GENERATOR ID | PRODUCTION TIME AND DATE | FROM | TO | FLAG |
|---|---|---|---|---|---|
| 1 | 1036 | 10 Oct. 2010 8:30 | 1 | 1 | 0 |
| 2 | 1036 | 10 Oct. 2010 8:30 | 3 | 5 | 0 |
| 3 | 0 | 0 | 1 | 1 | 1 |

Table 6 shows the carton ranges, representing 4 read cartons and one unread carton. The unread carton is contained in range 3 and is indicated by the flag value 1. Flag value 0 indicates a range of read counters and flag value 1 indicates a number of unread items. A flag value of 2 may be used for marked items (where marked items in this context are those items that have a counting or synchronization problem rather than a reference to the marking that is performed by the system on all items).

TABLE 7

| RANGE ID | CODE GENERATOR ID | PRODUCTION TIME AND DATE | FROM | TO | FLAG |
|---|---|---|---|---|---|
| 1 | 1036 | 10 Oct. 2010 8:30 | 1 | 2 | 0 |
| 2 | 1036 | 10 Oct. 2010 8:30 | 4 | 6 | 0 |
| 3 | 1036 | 10 Oct. 2010 8:30 | 9 | 10 | 0 |
| 4 | 0 | | 1 | 3 | 1 |
| 5 | 1036 | 10 Oct. 2010 8:30 | 21 | 24 | 0 |
| 6 | 1036 | 10 Oct. 2010 8:30 | 26 | 27 | 0 |
| 7 | 1036 | 10 Oct. 2010 8:30 | 29 | 30 | 0 |
| 8 | 0 | | 1 | 2 | 1 |
| 9 | 1036 | 10 Oct. 2010 8:30 | 31 | 36 | 0 |
| 10 | 1036 | 10 Oct. 2010 8:30 | 39 | 40 | 0 |
| 11 | 0 | | 1 | 2 | 1 |
| 12 | 1036 | 10 Oct. 2010 8:30 | 47 | 50 | 0 |
| 13 | 0 | | 1 | 6 | 1 |
| 14 | 1036 | 10 Oct. 2010 8:30 | 12 | 13 | 0 |
| 15 | 1036 | 10 Oct. 2010 8:30 | 19 | 20 | 0 |
| 16 | 0 | | 1 | 6 | 1 |

Table 7 shows the ranges for the packs within the cartons, rearranged to correspond to the position of the reordered carton data.

It can be seen that even though the identifiers have been compressed into ranges of identifiers there is still a substantial volume of data that needs to be stored.

In accordance with the present invention, the data can be further compressed prior to storage and/or transmission by exploiting common production details associated with the ranges of counter values. All records for a given shipping case that have the same Code Generator ID and production date and time are grouped together in a single record to limit the number of records.

In accordance with one example, for each range a four byte record can be constructed, as follows:

[RRRRRRRR][RTTTTTT][TTTTFFFF][FFFFFFFS]

Where:
R[9]=Range Id (0-511)
T[11]=To (0-2047)
F[11]=From (0-2047)
S[1]=Flag (0: Range, 1: Unread Count)

Using the carton ranges as an example, the three ranges are converted to:
00000000 10000000 00010000 00000010
(0, 128, 16, 2)
00000001 00000000 01010000 00000110
(1, 0, 80, 6)
00000001 10000000 00010000 00000011
(1, 128, 16, 3)

These three ranges can then be combined into a single record, labelled "Mask" in Table 8. The mask consists of the ranges in sequential order. The mask is presented in hexidecimal format below, so 0, 128, 16, 2, 1, 0, 80, 6, 1, 128, 16, 3 becomes 008010020100500601801003.

TABLE 8

| COG ID | PRODUCTION TIME | MASK |
|---|---|---|
| 1036 | 10 Oct. 2010 8:30 | 0X008010020100500601801003 |

The pack ranges are compressed in the same way to form a single record as shown in table 9 below.

TABLE 9

| COG ID | PRODUCTION TIME | MASK |
|---|---|---|
| 1036 | 10 Oct. 2010 8:30 | 0x022080000860000112A080012A80810234B001033AE081033E4082044E8002055E20030618D00007264081070330000203200004032080050360800603600008 |

The data may be compressed to the form shown in Table 8 and Table 9 by a processor 110 connected to the server, prior to being sent to and stored in the central database 100.

Although one example has been described in detail, it should be clear that any suitable format for the range data may be used to form a single record associated with the common production details.

The invention has particular advantage for high speed manufactured items and in situations when reading efficiency of the unique identifiers is low. High efficiency of reading will mean successive counter values for the most part. However, if reading efficiency falls, the number of separately recorded ranges having common production details increases. It is then only by exploiting the common production details that the tracking of individual packs is viable. A system in accordance with the invention may be aligned on 32-bits, which makes it human readable, to the extent that a skilled person can easily group by groups of 4 bytes and identify which group of bytes belong to which range.

In order to retrieve shipping case from an identifier on a pack, the identifier must first be decoded to retrieve the production details. With this information all records in the central database 100 having the same production details can be retrieved. The records are then expanded into the individual ranges as shown in Table 7 and the counter number in the unique identifier matched to the corresponding range. The same process can be followed to locate the shipping case from an identifier on a carton.

In order to locate the carton in which a pack was contained, the shipping case must first be identified. Once the shipping case is determined, all of the carton ranges for that shipping case can be retrieved and the carton retrieved by using the counter number of the pack to determine which carton the pack was in.

The invention may be used by verifying and commissioning parties for identification of manufactured items within a batch of manufactured items or for volume verification. The commissioning party may be the manufacturer or another party which pre-defines the range of identifiers to be used, and allocates the manufactured items with identifiers within that range. The second party may be, for example, a national authority who needs to identify a particular manufactured item or determine the precise number of items manufactured.

The production details used in the unique identifiers can be defined appropriately depending on the rate of production, so as to minimize data storage requirements. The principle can be applied to packs of smoking articles, cartons of packs, shipping cases of cartons or pallets of shipping cases. In fact, the principle may be applied to any manufactured item or container for manufactured items.

The invention provides a number of advantages including reduced data storage and transmission requirements for identifiers for manufactured items.

The invention claimed is:

1. A method for generating and storing tracking data for manufactured items in a batch of manufactured items, the method comprising the steps of:
    at a production line:
        generating a unique identifier for each item, the unique identifier comprising production details and a counter value of an incremental counter, wherein an item comprises an individual product or a package containing a plurality of products, and wherein a plurality of items is packaged in a carton and a plurality of cartons are packaged in a shipping case; and
        applying to each item the corresponding unique identifier, applying to each carton a unique carton identifier containing product details, and applying to each shipping case a unique shipping case identifier;
    correlating the items and cartons allocated to each shipping case by:
        reading the unique identifiers associated with each item in the batch of the items and reading the unique carton identifiers to provide a list of read identifiers, wherein at least some unread counter values of the incremental counter, that are not associated with the items in the batch or not successfully read, are not in the list of read identifiers; and
        linking the unique identifiers for the items with corresponding unique carton identifiers, linking unique carton identifiers with corresponding unique shipping case identifiers, and linking unique shipping case identifiers with corresponding unique carton identifiers of all the cartons contained in a given shipping case;
    for all the items in a shipping case and for each shipping case identifier, generating a plurality of ranges of read carton identifiers where unread counter values of the incremental counter, that are not associated with the items in the batch or not successfully read, are put together for each shipping case and a plurality of ranges of read item identifiers where unread counter values of the incremental counter, that are not associated with the items in the batch or not successfully read, are put together for each carton, each range comprising a number of read identifiers having common production details and sequential counter values; and
    storing, in an electronic database, the plurality of ranges of read carton identifiers having common production details as a single data record and the plurality of ranges of read item identifiers having common production details as a single data record, at least one of the single data records comprising: the production details, an indication of each of the ranges of sequential counter values, and at least one of:
        counter values that are not associated with the items in the batch or not successfully read, but which are between the counter values contained in the ranges of the single data record, and
        a count of unread counter values of the incremental counter that are not associated with the items in the batch or not successfully read.

2. A method according to claim 1, wherein the production details comprise a production time.

3. A method according to claim 1, wherein the production details comprise a production location or a location of an apparatus that generates unique identifiers.

4. A method for tracking an item having a unique identifier generated and stored in accordance with claim 1, comprising the steps of:
    reading the unique identifier associated with the item;
    extracting the production details from the unique identifier; and
    extracting data records having matching production details from the electronic database.

5. A method according to claim 4, further comprising identifying the unique identifier from the data records having matching production details.

6. A method according to claim 4, further comprising the steps of recording the location of the item where the step of reading is performed and storing the location in the electronic database.

7. A method according to claim 1, wherein, prior to generating a plurality of ranges of read carton identifiers and a plurality of ranges of read item identifiers, reordering the data to put together the counter values that are not associated with the items in the batch or not successfully read.

8. Apparatus for generating and storage of tracking data for manufactured items in a batch of manufactured items comprising:
    at a production line, means for generating a unique identifier for each item, the unique identifier comprising production details and a counter value of an incremental counter, wherein an item comprises an individual product or a package containing a plurality of products, and wherein a plurality of items is packaged in a carton and a plurality of cartons are packaged in a shipping case;
    at the production line, means for applying to each item the corresponding unique identifier for associating each item with the corresponding unique identifier, applying to each carton a unique identifier containing product details, and applying to each shipping case a unique shipping case identifier;
    reading means for reading the unique identifiers associated with each item in the batch of the items to provide a list of read identifiers, reading the unique identifiers associated with cartons to provide a list of read identifiers, and reading the unique identifiers associated with shipping cases to provide a list of read identifiers, wherein at least some unread counter values of the incremental counter, that are not associated with the items in the batch or not successfully read, are not in the list of read identifiers;
    processing means for generating, for each shipping case identifier, a plurality of ranges of read carton identifiers where unread counter values of the incremental counter, that are not associated with the items in the batch or not successfully read, are put together for each shipping case and a plurality of ranges of read item identifiers where unread counter values of the incremental counter, that are not associated with the items in the batch or not successfully read, are put together for each carton, each range comprising a number of read identifiers having common production details and sequential counter values; and memory means for hosting an electronic database storing the plurality of ranges of read carton identifiers having common production details as a single data record and storing the plurality of ranges of read item identifiers having common production details as a single data record, at least one of the single data records comprising: the production details, an indication of each of the ranges of sequential counter values, and at least one of:
- counter values that are not associated with the items in the batch or not successfully read, but which are between the counter values contained in the ranges of the single data record, and
- a count of unread a count of unread counter values of the incremental counter that are not associated with the items in the batch or not successfully read.

9. Apparatus according to claim 8, wherein the production details comprise a production time.

10. Apparatus according to claim 8, wherein the production details comprise a production location or a location of an apparatus that generates unique identifiers.

11. A system for generating and storing data for manufactured items in a batch of manufactured items comprising:
- at a production line, a code generator adapted and configured to create a unique identifier for each item, the unique identifier comprising production details and a counter value of an incremental counter, wherein an item comprises an individual product or a package containing a plurality of products, and wherein a plurality of items is packaged in a carton and a plurality of cartons are packaged in a shipping case;
- at the production line, a labeler constructed to apply to each item the corresponding unique identifier, apply to each carton a unique carton identifier containing product details, and apply to each shipping a case a unique shipping case identifier;
- a code reader constructed to read the unique identifiers associated with each item in the batch of the items to provide a list of read identifiers, read the unique identifiers associated with cartons, and read the unique identifiers associated with shipping cases, wherein at least some unread counter values of the incremental counter, that are not associated with the items in the batch or not successfully read, are not in the list of read identifiers;
- a processor operably coupled to the code reader and configured to generate, for each shipping case identifier, a plurality of ranges of read carton identifiers where unread counter values of the incremental counter, that are not associated with the items in the batch or not successfully read, are put together for each shipping case and a plurality of ranges of read item identifiers where unread counter values of the incremental counter, that are not associated with the items in the batch or not successfully read, are put together for each carton, each range comprising a number of read identifiers having common production details and sequential counter values, and to compress a plurality of ranges into a single data record, the single data record comprising the production details, an indication of each of the ranges of sequential counter values, and at least one of:
  - counter values that are not associated with the items in the batch or not successfully read, but which are between the counter values contained in the ranges of the single data record, and
  - a count of unread counter values of the incremental counter that are not associated with the items in the batch or not successfully read; and
- a memory comprising an electronic database adapted and configured to store the single data record.

12. The system of claim 11, wherein the labeler is a printer or a label applicator.

13. The system of claim 11, wherein code generator is a bar code generator.

14. The system of claim 11, wherein the code reader comprises an optical scanner.

\* \* \* \* \*